United States Patent [19]

Eisenacher

[11] Patent Number: 4,528,879

[45] Date of Patent: Jul. 16, 1985

[54] BUNDLE CUTTER DECENTRALIZED COMPACT CONSTRUCTION

[75] Inventor: Heinz Eisenacher, Fuldabrück, Fed. Rep. of Germany

[73] Assignees: Thyssen Industrie AG, Essen; Deutsche Gesellschaft für Wiederaufarbeitung von Kernbrennstoffen mbH, Hanover, both of Fed. Rep. of Germany

[21] Appl. No.: 496,662

[22] Filed: May 20, 1983

[30] Foreign Application Priority Data

Jun. 3, 1982 [DE] Fed. Rep. of Germany ....... 3220802

[51] Int. Cl.$^3$ .................... B23D 15/04; G21L 19/36
[52] U.S. Cl. ......................... 83/278; 83/444; 83/461; 83/694; 83/698; 83/925 R; 29/400 N
[58] Field of Search ............... 83/694, 444, 437, 719, 83/465, 925 R, 278, 448, 438, 449, 397, 198, 698, 461; 29/400 N

[56] References Cited

U.S. PATENT DOCUMENTS

| 2,404,901 | 7/1946 | Libs | 83/694 |
| 3,496,813 | 2/1970 | Valente | 83/694 |
| 3,855,684 | 12/1974 | Kendall | 83/925 R |
| 4,000,391 | 12/1976 | Yeo | 83/925 R |

Primary Examiner—James M. Meister
Assistant Examiner—John L. Knoble
Attorney, Agent, or Firm—Becker & Becker, Inc.

[57] ABSTRACT

A cutter for cutting, in stages, irradiated bundles of nuclear fuel rods, especially from pressurized-water or boiling-water reactors. The cutter includes a feed channel associated with transverse and longitudinal feed devices for the rod bundle. A cutter housing is arranged at the mouth of the channel. A cutter carriage can be moved at right angles to the feed channel and is provided with a cutter blade; a fixed counter-blade cooperates with this cutter blade; a rod bundle clamping mechanism is located ahead of the cutting plane and is provided with two alternately actuatable clamping jaws. The cutter carriages, the cutting blade, the counter-blade, and the two clamping jaws can be removed and replaced. The transporting, clamping, and cutting devices are respectively provided with their own drive unit. The feed device has a guide channel formed by a fixed table plate which is provided with a guide bar mounted thereon, by a removable supporting beam which is provided with a closure slide, and by a second removable supporting beam. An interchangeable guide rail is provided for the cutter carriage.

4 Claims, 3 Drawing Figures

BUNDLE CUTTER DECENTRALIZED COMPACT CONSTRUCTION

BACKGROUND OF THE INVENTION

The present invention relates to a cutter for cutting, in stages, irradiated bundles of nuclear fuel rods, especially from pressurized-water or boiling-water reactors. The cutter includes a feed channel with which is associated transverse and longitudinal feed devices for the rod bundle. The cutter also includes a cutter housing arranged at the mouth of the channel and provided with a cutter carriage which can be moved at right angles to the feed channel and which is provided with a cutting blade; a fixed counterblade which cooperates with the cutting blade; and a rod bundle clamping mechanism which is located ahead of the cutting plane and is provided with two alternately actuatable clamping jaws. The cutter carriage, along with the cutting blade, the counter-blade, and the two clamping jaws can be removed and replaced. Furthermore, the transporting, clamping, and cutting devices are respectively provided with their own drive unit.

With such cutters, not only the cutting tools, but also all of the other parts which are located within the feed device and the cutter housing, but which do not take part in the cutting procedure, are subjected to considerable wear and therefore require frequent repair or replacement. Of course, the cutting tools are of greater significance, since if during cutting deformations in the form of compressed tube openings result, these deformations have a negative affect on the subsequent chemical separating process due to the thereby retarded acid attack.

German Offenlegungsschrift No. 28 57 114 discloses a cutter of the aforementioned general type which is provided with an exchangeable cutter head in which are located not only two clamping jaws of a clamping device, which clamping jaws can be moved back and forth, but also a cutter carriage which can be moved back and forth and which is provided with a blade and an abutment for supporting the fuel elements which are to be cut up. A drawback with this heretofore known cutter is that in order to replace individual parts, the entire cutter head must first be removed from the cutter. This removal of the cutter head additionally takes a lot of time because the movable parts in the cutter head are connected by means of driving and connecting rods with associated hydraulic drives, which are located outside of the cutter, and these connections must be disconnected before the cutter head can be lifted out of the cutter for replacement. This loss of time is also required for installation of the cutter head.

To avoid this drawback it is already known from German Patent 29 44 197 to construct a cutter unit in two parts, with a blade and its drive devices being arranged in the cutter unit, and with the blade being guided in a two-part cutter sleeve. After the upper part of the cutter unit is removed, the interior of the lower part of the cutter unit is more accessible, and the installation and removal of a component located in the lower part of the cutter unit is facilitated. This is not true, however, for the cutter blade, the lower surface and the two side surfaces of which are slidingly movable in the guide part of the blade, because the cutter blade is covered by a blade plate which is mounted on the guide part of the blade; this cutter plate impedes access to the blade and must be removed in order to replace or repair the cutter blade.

It is an object of the present invention to construct a cutter of the aforementioned general type for cutting, in stages, irradiated bundles of nuclear fuel rods in such a way that all of the structural components which take part in the gradual feed and the cyclic cutting, and which are either movable or fixed, can be exposed and replaced or exchanged in a simple manner.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The cutter of the present invention is characterized primarily in that: the feed device and the cutter housing each comprise at least two parts, including fixed and removable parts which are positively connected with one another by means of securing means; the feed device has a guide channel which is formed by a fixed table plate which is provided with a guide bar mounted thereon, by a removable supporting beam which is provided with a closure slide, and by a second removable supporting beam; the cutter housing is divided by a plane of separation which extends at right angles to the cutting plane and is essentially linear, with two top parts being arranged in the upper part of the cutter housing in such a way that they are stacked in one another and can be removed from one another; and the top plate in the upper part of the cutter housing, and the bottom in the lower part of the cutter housing are each provided with an interchangeable guide rail for the cutter carriage.

In contrast to the heretofore known cutter, with the inventive features, while maintaining the facilitated installation and removal, when the upper part of the feed device and/or of the cutter housing is removed, access by a lifting device, which acts from above to the movable and rigid removable structural components, or to a rod bundle which could become bound in the guide channel, is not obstructed. Furthermore, the remote-controlled maintenance of the bundle cutter is facilitated in this manner.

Pursuant to further embodiments and advantageous features of the present invention, when the upper part of the cutter housing is removed, it can be possible to remove the cutter carriage with the blade, the fixed counter-blade, and the rod bundle clamping mechanism independently of one another from their normal positions in the lower part of the cutter housing. When the upper part of the cutter housing is removed, the drive units for the cutter carriage and the rod bundle clamping mechanism may be positively connected with the lower part of the cutter housing.

The securing means, which become operational when the removable and fixed parts of the feed device and of the cutter housing are assembled, may at the same time serve as centering means.

DESCRIPTION OF A PREFERRED EMBODIMENT

Figure 1:
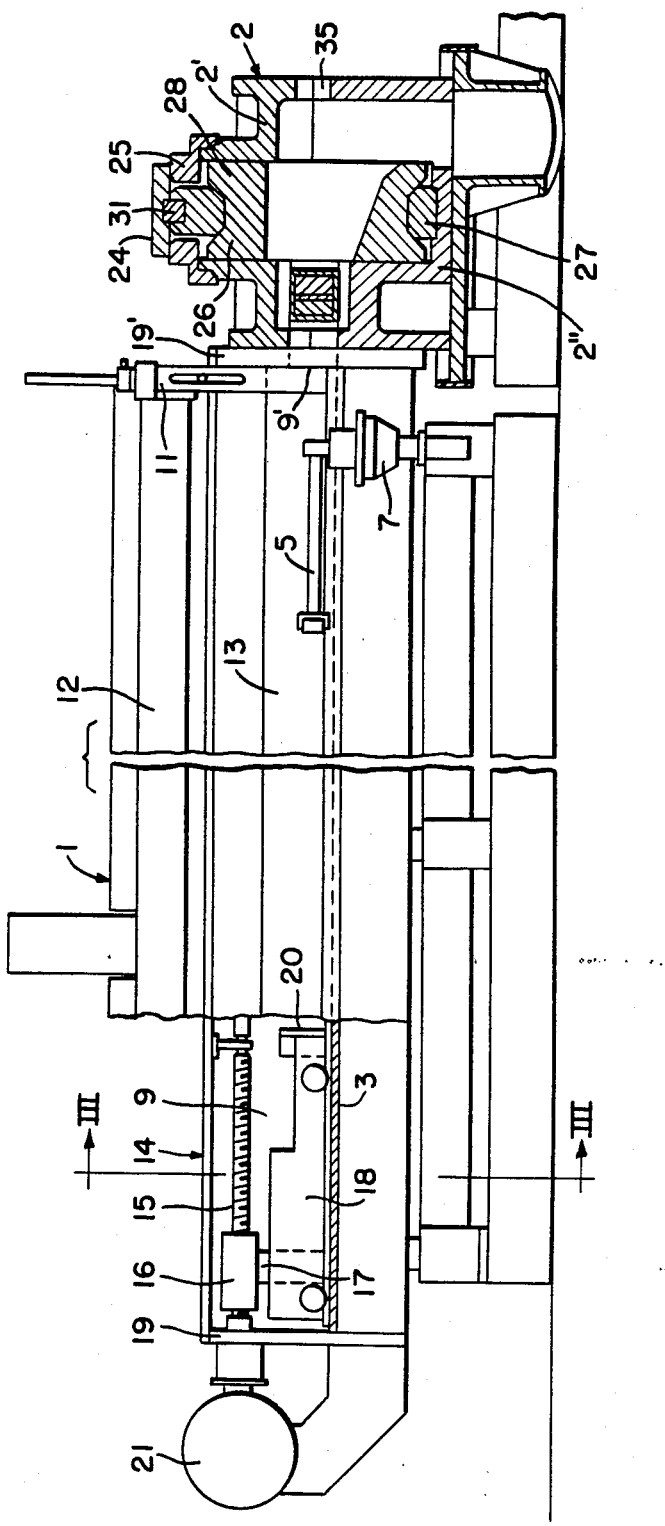
FIG. 1 is a partial side view of the inventive cutter, with the feed device being broken open, and the cutter being shown in a longitudinal central section.
Figure 2:
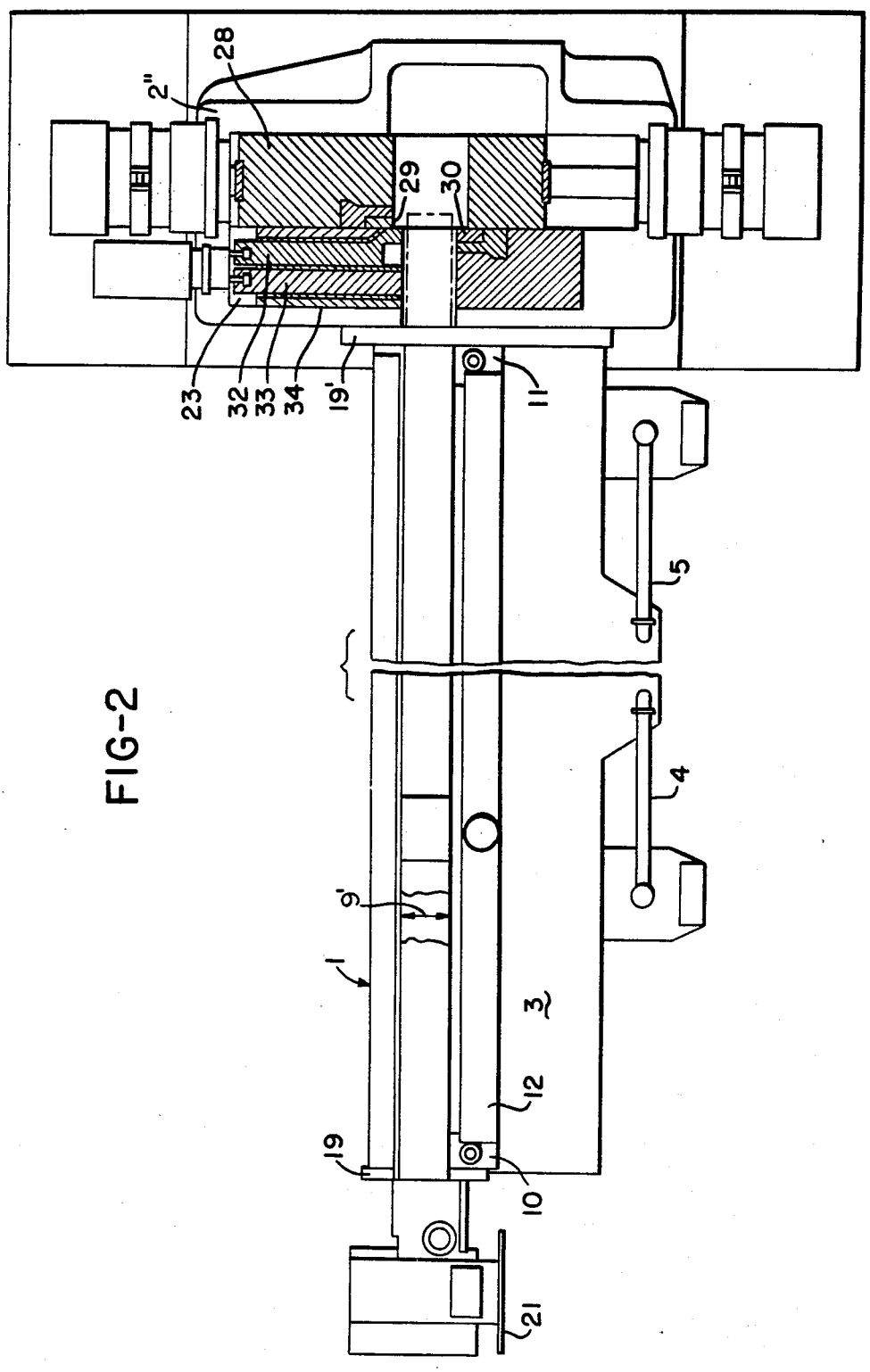
FIG. 2 is a plan view of the cutter of FIG. 1, with the upper part of the cutter housing being removed, and showing the lower part of the cutter housing and the inventive components located therein in section.
Figure 3:
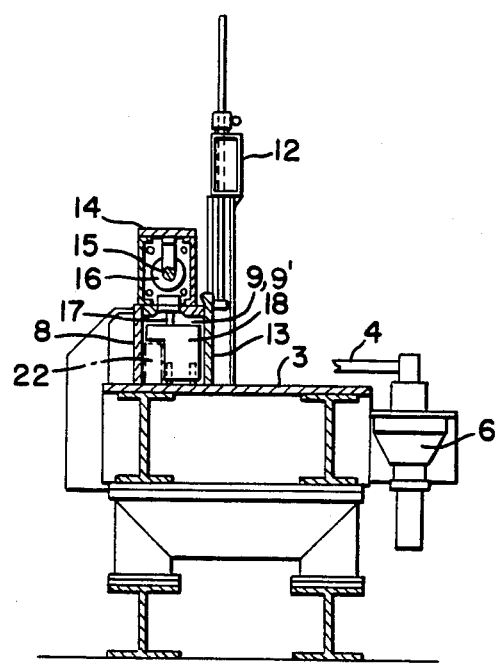
FIG. 3 is a view taken along line III—III in FIG. 1.

Referring now to the drawings in detail, the illustrated bundle cutter essentially comprises a feed device 1, and a cutter housing 2. For the mechanical size reduction, the irradiated bundles of nuclear fuel rods are placed on a table 3 of the feed device 1 and are then pushed by cross-push devices 6, 7 against a guide bar 8 which is mounted on the table 3; in particular, the bundles are pushed by means of pivot arms 4, 5 of the devices 6, 7, which pivot arms 4, 5 are movable parrallel to the surface of the table 3. The guide bar 8 is at the same time a wall of a guide channel 9, and is disposed at right angles to the cutter housing 2. The movements of the two pivot arm 4, 5 can be effected in the same or opposite directions by drive devices located below the table 3. As shown in FIG. 2, on both end faces of the table 3 there is located a respective support 10, 11 between which is arranged a supporting beam 12 on which is mounted a closure slide 13 which can be raised and lowered, and which in the lowered position forms with the guide bar 8 the side parts of the guide channel 9. The devices which effect the lifting movements of the closure slide 13 are known per se, and are predominantly located in the two supports 10 and 11.

The guide bar 17 of a second supporting beam 14 extends into the guide channel 9, where it positively engages in a feed carriage 18. A longitudinally extending spindle 15 having a nut 16 is located in the second supporting beam 14 which has a box-like section and is open at the bottom. In the operating mode, the supporting beam 14 is supported on the guide bar 8 as well as on plates 19 and 19' which are arranged at the end faces of the table 3; the supporting beam 14 is positively centered by these plates 19 and 19'. The feed carriage 18 slidingly pushes the rod bundle located at the guide bar 8 along the bottom of the channel 9 toward the cutter housing 2. That end face of the feed carriage 18 which faces the cutter is provided with a replaceable pressure plate 20. Furthermore, that side of the supporting beam 14 remote from the cutter housing 2 is provided with a drive device for those parts which effect the longitudinal feed. In addition, an indicator 21 is provided for recognizing the respective position in the guide channel 9 of the feed carriage 18 which is concealed by the stationary guide bar 8 and the closure slide 13 which can be lowered.

Also known per se are the devices (not shown) which produce the gradual longitudinal feed of the rod bundle which is to be cut up, and which can be adjusted to preselected segment lengths.

In the event a rod bundle having a smaller cross section is to be cut up, the guide channel 9 is appropriately adapted by means of a filler piece 22 which can be placed in the channel 9 and which rests against the stationary guide bar 8; a pressure plate 20 which is adjusted to the changed aperture or opening 9' for discharge of rod bundles in the channel 9 is installed on the feed carriage 18. The bundle of rods is pushed by the feed carriage 18 into the cutter housing 2, which comprises a fixed lower housing part 2", and an upper housing part 2' which can be removed from the lower housing part 2". In the housing 2, the bundle is acted upon, for the subsequent cutting procedure, by a clamping mechanism 23 which performs two functions.

A top plate 24 and a top frame 25 are mounted in the upper part 2' of the cutter housing, in a top opening, in such a way as to be stacked in one another. On the bottom of the top plate 24, and on the bottom of the lower part 2" of the cutter housing, are located exchangeable guide rails 26 and 27 for a movable cutter carriage 28 which is part of the cutting device. The cutter carriage 28 is provided with an interchangeable blade 29 which cooperates with a fixed counter-blade 30 which is disposed in the lower part 2" of the cutter housing. With respect to the clamping mechanism 23, the counter-blade 30 is offset in the longitudinal feed direction of the rod bundle. For the embodiment illustrated, the drive device for the movement of the cutter carriage 28 comprises two piston-cylinder units which are acted upon on one side and which are operatively connected with the cutter housing 2.

So that a satisfactory guidance of the cutter carriage 28 can be constantly assured, the guide rail 26 on the top plate 24 is provided with a known clearance-adjusting device which is provided with an adjusting key 31 which can be actuated from the outside on the upper part 2' of the cutter housing.

The clamping mechanism 23 comprises two vertical pressure feet 32, 33 which are disposed parallel to one another, and can be moved against the rod bundle independently of one another. The pressure feet 32, 33 are accommodated in an interchangeable cartridge 34 which is also positively connected with the cutter housing 2. In the illustrated embodiment, the drive devices for the pressure feet 32, 33 comprise two double acting piston-cylinder units which are accommodated together in a unit (not illustrated in detail), which is positively connected with the cutter housing 2. The two pressure feet 32, 33 press the advanced broad bundle against an abutment, and hold it firmly in place. At the same time, the firmly held broad bundle is preliminarily compacted by means of these pressure feet.

In order to be able to control the cutting procedure in the cutter housing 2 from the outside, or in order to be able to eliminate or correct slight problems during the cutting, a viewing opening 35 is provided in that wall of the cutter housing which is remote from the feed device 1; this viewing opening 35 can be covered by a closure cap.

The plane of separation between the upper and lower parts 2' and 2" of the cutter housing extends at right angles to the cutting plane of the two blades 29 and 30, and, with the exception of arresting means, extends in one plane. The upper and lower parts 2' and 2" of the cutter housing are connected with one another be means of bolts.

If repair or exchange of the parts of the feed device 1 or in the cutter housing 2 is required, it is only necessary to lift the upper part of the feed device 1 or of the cutter housing 2 from the pertaining fixed lower part thereof in order to expose the parts which need to be repaired or exchanged. This is also true in the event of a possible binding of the rod bundle in the guide channel 9. The thus exposed structural components can either be left in their normal positions, where they are supported in the fixed lower parts, or they can be lifted out of their normal positions by means of lifting apparatus for the purpose of exchange.

So that when the lifted-out parts are returned to their normal positions, they can again satisfactorily assume their original positions and need not be aligned again, known positive arresting means are provided for their connection with the fixed parts; these arresting means at the same time serve for centering.

Due to the mechanical assembly technique of the inventive cutter, it is possible within a short period of time to not only eliminate without difficulty disruptions in operation (for example failure of important drive or cutting elements), but also, for other rod bundle shapes and dimensions, to exhange those components which take part in the feed and in the size reductions.

The present invention is, of course, in no way restricted to the specific disclosure of the specification and drawings, but also encompasses any modifications within the scope of the appended claims.

What I claim is:

1. A cutter for cutting, in stages and in a cutting plane, irradiated bundles of nuclear fuel rods, said cutter comprising:
   a feed device, which has a guide channel formed by: a fixed table plate which is provided with a guide bar mounted thereon, a removable supporting beam which is provided with a transverse feed device in the form of a closure slide, and a second removable supporting beam; a longitudinal feed device in the form of a feed carriage for rod bundles is also associated with said guide channel, which has an opening for discharge of rod bundles; said fixed and removable parts of said feed device can be positively connected with one another by securing means;
   a cutter housing disposed at said discharge opening of said guide channel for receiving rod bundles therefrom; said cutter housing including a cutter carriage which can be moved at right angles to said guide channel and which is provided with a cutter blade; said cutter housing also includes a fixed counter-blade which cooperates with said cutter blade; said cutter housing further includes a rod bundle clamping mechanism which is provided with two alternately actuatable jaws, and which is located ahead of said cutting plane when viewed in the direction of movement of rod bundles from said guide channel to said cutter housing; said cutter carriage, said cutter blade, said counter-blade, and said two jaws of said clamping mechanism can be removed and replaced, and said feed carriage, said closure slide, said clamping mechanism, and said cutter carriage are respectively provided with drive units; said cutter housing is divided by a plane of separation, which is arranged at right angles to said cutting plane and extends essentially linearly, into a fixed lower housing part and a removable upper housing part which can be positively connected with one another by securing means;
   a top plate and a top frame arranged in said upper housing part in such a way as to be stacked in one another and removable from one another; and
   a respective interchangeable guide rail, for said cutter carriage, associated with said top plate in said upper housing part, and with the bottom in said lower housing part.

2. A cutter according to claim 1, in which, when said upper housing part is removed, said cutter carriage with its blade, said fixed counter-blade, and said rod bundle clamping mechanism can be removed independently of one another from their normal positions in said lower housing part.

3. A cutter according to claim 2, in which, when said upper housing part is removed, said drive units for said cutter carriage and for said rod bundle clamping mechanism are positively connected with said lower housing part.

4. A cutter according to claim 1, in which said securing means, which become operational when said removable and fixed parts of said feed device and said cutter housing are respectively connected with one another, at the same time serve as centering means.

* * * * *